US010724269B2

(12) United States Patent
Flight

(10) Patent No.: US 10,724,269 B2
(45) Date of Patent: Jul. 28, 2020

(54) FENCING ELEMENT

(71) Applicant: Leslie Erle Flight, Hamilton (NZ)

(72) Inventor: Leslie Erle Flight, Hamilton (NZ)

( * ) Notice: Subject to any disclaimer, the term of this patent is extended or adjusted under 35 U.S.C. 154(b) by 670 days.

(21) Appl. No.: 15/528,757

(22) PCT Filed: Nov. 19, 2015

(86) PCT No.: PCT/NZ2015/050195
§ 371 (c)(1),
(2) Date: May 22, 2017

(87) PCT Pub. No.: WO2016/080849
PCT Pub. Date: May 26, 2016

(65) Prior Publication Data

US 2017/0321449 A1 Nov. 9, 2017

(30) Foreign Application Priority Data

Nov. 20, 2014 (NZ) ........................................ 702168
Dec. 17, 2014 (NZ) ........................................ 703113

(51) Int. Cl.

| | |
|---|---|
| ***E04H 17/12*** | (2006.01) |
| ***H01B 17/14*** | (2006.01) |
| ***A01K 3/00*** | (2006.01) |
| ***E04H 17/10*** | (2006.01) |

(52) U.S. Cl.
CPC ............. *E04H 17/12* (2013.01); *A01K 3/005* (2013.01); *E04H 17/10* (2013.01); *H01B 17/145* (2013.01)

(58) Field of Classification Search
CPC .......... A01K 3/005; E04H 17/10; E04H 17/12
See application file for complete search history.

(56) References Cited

U.S. PATENT DOCUMENTS

| | | | | |
|---|---|---|---|---|
| 2,896,011 | A | 7/1959 | Huseby | |
| 3,820,758 | A | 6/1974 | Berg et al. | |
| 5,255,896 | A | 10/1993 | Letarte et al. | |
| 6,353,187 | B1 * | 3/2002 | Wilson, Jr. ............. | A01K 3/005 174/158 F |
| 6,583,363 | B1 * | 6/2003 | Wilson, Jr. ........... | H01B 17/145 174/158 F |
| 6,960,728 | B1 | 11/2005 | Halderman | |

FOREIGN PATENT DOCUMENTS

| | | |
|---|---|---|
| DE | 3521453 C2 | 6/1994 |
| WO | 2008039084 A2 | 4/2008 |

* cited by examiner

*Primary Examiner* — Daniel J Wiley
(74) *Attorney, Agent, or Firm* — AEON Law, PLLC; Adam L. K. Philipp

(57) ABSTRACT

This invention relates to a fencing element which includes at least one wire support for a wire, wherein the fencing element includes an elongate body, characterised in that the at least one wire support includes at least one groove and at least one protruding member, wherein a line is defined along the length of the at least one groove, and at least a portion of the protruding member intersects the line. The invention has particular application to the mounting and supporting of fencing wire on the fencing element.

18 Claims, 14 Drawing Sheets

FENCING ELEMENT

TECHNICAL FIELD

This invention relates to a fencing element used in the construction and establishment of fencing. The invention has particular application to the mounting and supporting of fencing wire on the fencing element.

BACKGROUND ART

Commonly, fencing wire is attached to fence posts by 'U' shaped staples that are hammered over the wire. This job is both time and labour intensive due to the difficulty of ensuring that the wire is attached so that it is level on different posts.

Furthermore, when the fencing wire is attached to battens often two people are needed—one to hold the batten and one to hammer the staples.

Additionally, this technique is undesirable when used with electrical fencing, which is now common in a number of industries, particularly in farming for controlling the movement of livestock.

Insulator fencing elements are now common for supporting electrical fencing wire. These are used as a contact point to prevent losses in electrical potential from the wire attachment point, and to protect the fence post from the wire.

However, previous insulator elements have limitations. They can be difficult to install—most are configured to be attached to a fence by a user with an additional fastening means such as a screw, nail or staple. For example see United States Design Application 102011120846. This also does not address the issue of ensuring that the wire is attached so that it is level on different posts—as the insulator must be installed by the user themselves.

Furthermore, the use of additional fastening means to secure the insulator elements to a fence post means that holes will need to be formed in the fence post for the additional fastening means. This may weaken the post, which can eventually result in a section of the fence collapsing. Additional fastening means often make it difficult to remove the insulator element from the fence post. Many insulator elements need to be removed from the fencepost in order to release the wire—this requires the additional fastening means to be removed and can result in damage to the insulator elements.

Other insulator elements may hold the wire in a loop. This means that the wire cannot be removed from the insulator element unless it is pulled from one side so that a free end of the wire is pulled through the loop. This requires the wire to be pulled through all the insulator elements on the fence posts preceding the post of interest. This can be a problem if a user needs to remove a wire from a single or a few fence posts—they will instead have to remove the wire from a far larger number of fence posts, which is labour and time intensive. For an example of such an insulator element see United States Patent Application No. 20130313001.

The wire holding portion of known insulator elements can also be problematic. For example, some insulator elements may allow the wire to slip from the wire holding portion. On the other hand, insulator elements that hold the wire securely can be cumbersome and difficult to insert the wire into.

It is the object of the present invention to address the foregoing problems or at least to provide the public with a useful choice.

All references, including any patents or patent applications cited in this specification are hereby incorporated by reference. No admission is made that any reference constitutes prior art. The discussion of the references states what their authors assert, and the applicants reserve the right to challenge the accuracy and pertinency of the cited documents. It will be clearly understood that, although a number of prior art publications are referred to herein, this reference does not constitute an admission that any of these documents form part of the common general knowledge in the art, in New Zealand or in any other country.

Throughout this specification, the word comprise", or variations thereof such as "comprises" or "comprising", will be understood to imply the inclusion of a stated element, integer or step, or group of elements integers or steps, but not the exclusion of any other element, integer or step, or group of elements, integers or steps.

It is an object of the present invention to address the foregoing problems or at least to provide the public with a useful choice.

Further aspects and advantages of the present invention will become apparent from the ensuing description which is given by way of example only.

DISCLOSURE OF THE INVENTION

According to one aspect of the present invention there is provided a fencing insulator which includes a support for a wire, wherein the fencing insulator includes a body, characterised in that the body of the fencing insulator includes at least one grip configured to secure the fencing insulator to a fencing element.

According to another aspect of the present invention there is provided a method of manufacturing a fencing unit, wherein the fencing unit includes:

a fencing insulator, and an fencing element, characterised by the step of fixing the fencing element to the insulator by injection moulding.

Reference to a fencing element should be understood to mean a solid structural support commonly used in fencing. For example, the fencing element may be a batten, post, stake, rail, shaft or a gate. It can also include fencing accessories, such as gate handles. Please note that these examples are not intended to be limiting. The fencing element may be made of any material; for example the fencing element may be made of wood, steel, or plastic material such as polypropylene, fiberglass, high density polyethylene or a composite of plastic materials. However, this should not be seen as limiting and the fencing element may be made of any material.

Reference will now be made throughout the specification to the use of the invention with a batten, although this is not intended to be limiting.

Reference to a batten should be understood to mean an elongate solid structure that is used in addition to fence posts to build a fence. In fencing a batten may be used to strengthen a fence or to maintain the spacing of the wires. A batten may be attached to the wires of a fence, so that the batten is substantially at right angles to the line of the wires, in order to improve or maintain the integrity of the fence. In essence battens serve as pseudo-fence posts, the main difference being that battens are normally not engaged with the ground when in use.

In use of this exemplary embodiment of the invention, the fencing insulator is secured to a portion of the batten, for example, the side or an edge of the batten. In an exemplary embodiment, the batten may be substantially 'Y' shaped in cross section, with three intersecting limbs at an angle of 120° from each other—such as those commonly known by the names Y post or WARATAH. In this embodiment, the invention may be secured to the end of two of the three limbs.

In exemplary embodiments, the batten is moulded by extrusion methods, as this is cheaper than other forms of moulding. However, this should not be taken as limiting and the batten may be made by any manufacturing process.

In exemplary embodiments, the fencing insulator is injection moulded as a one piece component.

In exemplary embodiments, the batten is moulded to be substantially complementary to the shape of the fencing insulator to prevent unwanted movement of the fencing insulator when it is attached to the batten, or to aid removal of the fencing insulator. This may also decrease the possibility of the grip (discussed below) breaking when it is secured to the batten.

Reference to a wire should be understood to mean a slender, elongate piece or filament of semi-rigid or flexible material. In exemplary embodiments the wire may be made of metal. However, this is not intended to be limiting and the wire may be made of any material, including plastics or textiles materials, or combination of materials. For example the wire may be synthetic cord.

In exemplary embodiments the wire may have the ability to conduct electricity. However, this should not be seen as limiting and the wire may be unable to conduct electricity.

Reference to a fencing insulator should be understood to mean a structure that is configured to both support a wire and be secured to a portion of a batten.

The fencing insulator may be permanently secured to a portion of a batten. In an exemplary embodiment, the fencing insulator may be releasably secured to a portion of a batten.

The fencing insulator may be of any shape.

The fencing insulator may be made of any suitably rigid material. For example, the insulator may be made of metal, rubber, or a plastic material such as polypropylene, fiberglass, high density polyethylene or a composite of plastic materials. The insulator may be formed as a substantially solid material but it may also be manufactured as a frame structure to save on materials. For example, the attachment may be made from a wire frame.

In an exemplary embodiment, the fencing insulator may be made of a resilient material. This may add flexibility to the sides of the fencing insulator, which may help with the securing mechanism (described in more detail below).

In an exemplary embodiment, the fencing insulator is made of a plastics material such as polypropylene. Polypropylene is advantageous as it is low cost and UV stabilized for both sun and chemical resistance. This may contribute to the durability of the fencing insulator. Durability may be particularly beneficial in installation, as this may have a high impact on the insulator. It may also be beneficial during use as it may allow the fencing insulator to withstand the stress imposed by the weight and tension of the wiring and also possible impact by an animal.

The fencing insulator may be a unitary structure or alternatively made of multiple parts assembled together. If the fencing insulator is made of an assembly of parts, the constituent components may be made of the same material or of different materials.

In an exemplary embodiment, the fencing insulator may be a unitary structure. This results in a saving when manufacturing, in terms of both costs and labour.

In exemplary embodiments, the fencing insulator is made of plastics material by injection moulding. Injection moulding may be beneficial as it allows the creation of relatively complex shapes. However, this should not be taken as limiting and the fencing insulator may be made by any moulding or manufacturing technique.

In exemplary embodiments the fencing insulator has a body. The body of the fencing insulator should be taken to mean a unitary structure that makes up the largest portion of the fencing insulator.

The body may have a bottom and a top that define the length of the body.

The top of the body should be understood to be a side of the body that will be located further from the ground relative to the bottom border when the fencing insulator is in use.

The bottom of the body should be understood to be a side of the body that will be located closer to the ground relative to the bottom border when the fencing insulator is in use.

The body may have a front and a back that define the depth of the body.

The back of the body should be understood to be the side of the body that is closest to the fencing element when in use.

The front of the body should be understood to be a side of the body that is further from the fencing element relative the back of the body when in use.

The body may also have a first lateral side and a second lateral side that define the width of the body.

In an exemplary embodiment the body may be made of a resilient material. This may allow for a small amount of flexibility between the first and second lateral sides, which may help the gripping mechanism of the body (described in more detail below).

The back of the body may include a depression.

The depression may function to allow the sides of the body to be pushed together (which will result in the sides of the depression being moved away from each other), which may assist the securing mechanism of the insulator element (described in more detail below).

In an exemplary embodiment, the depression may extend between the top and the bottom of the body.

In an exemplary embodiment, the depression may extend fully between the top and the bottom of the body, resulting in an open mouth at both the top and bottom side of the body. This may be beneficial is allowing the sides of the body to be pushed together evenly. However, this is not intended to be limiting, and in an alternative embodiment the depression may extend only partially between the top and the bottom of the body, so there is only one open mouth, at either the bottom or the top of the body.

The depression may have a first lateral side and a second lateral side which define the width of the depression.

The depression may have an elongate opening, which should be understood to be the opening of the depression that runs between the top and bottom of the body.

In an exemplary embodiment, the elongate opening may be the widest point of the depression. The sides of the elongate opening may slope down to the end of the depression, which may be the narrowest point. This may make it easier for the sides of the depression to be moved away from each other when the sides of the body are pushed together. However, this is not intended to be limiting and the depression width may vary. For example, the width may be consistent along the depression, or the end of the depression may be wider than the elongate opening.

The depression may be located substantially centrally between the first lateral side and second lateral side of the body. This may also function to allow the sides of the body to be pushed together evenly.

However, this is not intended to be limiting, and the depression may be located closer to either the first lateral side or second lateral side of the body.

The depth of the depression may be defined by the elongate opening and the end of the depression.

In an exemplary embodiment, the depression may be deep. A deep depression should be taken to mean a depression that has a depth of at least one third of the depth of the body. A deep depression may be beneficial, as it may allow the sides of the body to be pushed closer together to assist the gripping function of the insulator (described in more detail below).

The back of the body may also include at least one sloped portion.

In an exemplary embodiment, the back of the body includes two sloped portions on either side of the recess.

The sloped portion may mean the back of the body is complementary to the configuration of a 'Y' or WARATAH batten. This may be advantageous as it may provide more stability when the fencing insulator is used with such a batten.

In an exemplary embodiment, the slope is angled at 30° from the back of the fencing insulator, which will allow it to fit between two limbs of a 'Y' batten that are at 120° from each other.

In an exemplary embodiment the insulator includes a grip. Reference to a grip should be understood to mean a part of the body (which may include the whole body) that is configured to secure the insulator to a fencing element.

In an exemplary embodiment the insulator includes two grips, which should be taken to mean two parts of the body that are configured to secure the insulator to a fencing element. However, this is not intended to be limiting and the insulator can include any number of grips.

The grips may be positioned at any point of the body. In an exemplary embodiment a grip is positioned proximate each lateral side on the back of the insulator. However, this is not intended to be limiting and the grips may be positioned at any point of the body. For example, the grips may be located proximate the top of the body.

Each grip may be a recess.

In an exemplary embodiment each recess may be substantially complementary to the end of a limb of a 'Y' post, so that in use each recess may retain an end of a limb. However, this is not intended to be limiting and a recess may be substantially complementary to any portion of a batten, for example a recess may be substantially complementary to the side of a batten.

The recess may have an opening.

In an exemplary embodiment the opening of the recess may be the narrowest part of the recess. This may create a partially enclosed receptacle. In use this may retain a part of a batten within the recess.

However this is not intended to be limiting and in an embodiment the recess may be of substantially uniform width. For example, the recess may be configured of a uniform width that fits tightly on the batten portion in order to secure the fencing insulator to the batten.

In the above two embodiments, a body that is slightly flexible between the first and second lateral sides, or that is configured to allow the first and second lateral sides to be moved towards each other (for example, due to a resilient material or a depression that runs between the top and bottom of the fencing insulator) may be advantageous. It may allow the grips to be moved, which may assist with positioning the grips over the portion of the batten which they are to retain.

However this should not be seen as limiting and in alternative embodiments the body may be solid without any flexibility.

The recess may also be fully enclosed. As an example, in use a fully enclosed recess may be inserted over the top of a batten and moved or forced down the batten to the preferred placement position of the fencing insulator.

In an alternative embodiment, the grip may be a body configuration that causes the insulator to bias against two limbs of a 'Y' fencing batten, or a similar fencing element with at least two substantially facing surfaces, to secure the insulator the batten.

The grips function may be enhanced when a wire is attached to the fencing insulator and run between the fencing insulators on different battens. The wire may be strained between strainer posts, and the resultant strained pressure of the wire on either side of the fencing insulator may cause the lateral sides of the body of the insulator be pushed together. In exemplary embodiments of the invention this may cause the grips to be further pushed onto the fencing element. In an exemplary embodiment, a tool may be used to secure the insulator to a fencing post. For example, the tool may be pliers or locking pliers such as vice grips. Reference will now be made throughout the specification to the tool being pliers, although this should not be seen as limiting. In use of an exemplary embodiment, the pliers will be used to push the first and second lateral sides of the depression or of the body of the fencing insulator together. The body of the insulator is then placed between the two limbs of a 'Y' fencing batten so that the grip portions are held relative the sides of the batten (or equivalent part of the batten that the fencing insulator grips are configured to secure to). The pliers are then released. This may the grips to be appropriately positioned and secured to the batten.

The insulator element may be crimped onto the fencing element by a suitable crimping means.

The insulator is also configured to include a wire support. A wire support should be understood to mean a part or parts of the insulator configured to engage and retain a wire when the batten is in use.

In an exemplary embodiment the wire support may include three protuberances from the front of the body. However, this should not be taken as limiting and the wire support may include any number of protuberances.

In any set of three protuberances there will be a central protuberance and two corresponding outer protuberances (one on each side of the central protuberance).

In an exemplary embodiment a first outer protuberance is located proximate the first lateral side of the insulator body and a second outer protuberance is located proximate the second lateral side of the insulator body.

In a preferred embodiment at least one protuberance includes an engagement portion configured to retain a wire.

Reference to an engagement portion of a protuberance throughout this specification should be understood to mean a part of the protuberance configured to engage and retain a wire when the batten is in use.

The outer protuberances may be configured as hooks.

A hook should be understood to refer to any shape which extends from the front of the insulator body before bending back, leaving an opening through which a wire may be retained.

In an exemplary embodiment each hook may create an opening that is substantially on the same plane as the front of the body. The opening may be the engagement portion.

This is not intended to be limiting, and those skilled in the art will appreciate that other shapes of the outer protuberances may be used to retain the wire, so as to hinder unintentional removal of the wire from the protuberance.

The central protuberance may be configured to include an engagement portion that is a lip and/or groove which, in use, may provide a seat for a wire. The lip and/or groove may hinder movement of a wire away from the protuberance until physically disengaged by a fencer.

This is not intended to be limiting, and those skilled in the art will appreciate that other shapes of the central protuberance may be used to retain the wire, so as to hinder unintentional removal of the wire from the protuberance. For example, the central protuberance may configured as a boss or the like and include a threaded aperture to allow the use of a fastener, such as a screw, with a head or a washer behind which the wire may be clamped.

In an exemplary embodiment the central protuberance may be elevated from the front of the insulator body. This may create a ridge that extends from the engagement portion. In an exemplary embodiment, the ridge is closer to the top of the insulator body than the engagement portion. In use, the wire may be bent over the ridge to contact the engagement portion of the central protuberance, creating a bend in the wire that may act to securely hold the wire against the insulator body.

In an exemplary embodiment the central protuberance engagement portion may be a groove in the ridge that is configured to retrain the wire above a lip. This embodiment may be particularly useful for fencing insulators that are to be secured to a fence post, as the groove means that the wire will be bent to a lesser degree over the ridge. This means the wire may be held relatively loosely, so that the wire can be pulled through insulator when the fence is strained.

In an exemplary embodiment the central protuberance engagement portion may be a lip. This embodiment may be particularly useful for fencing insulators that are to be secured to a batten as the wire will be bent over the full ridge. This means that the wire may be held relatively tightly, so that movement of the batten along the wire and up and down is restricted.

In an exemplary embodiment at least one protuberance has an access portion.

Reference to an access portion of a protuberance throughout this specification should be understood to refer to a portion of a protuberance configured to facilitate movement of a wire over the surface of the protuberance.

An access portion may be in the form of a ramp. A ramp may be considered as any shape which allows a wire to be moved relatively freely over it. A ramp generally involves a surface which is inclined with respect to the face from which it originates. A ramp is frequently planar, but need not be so as any inclined surface which facilitates movement of a wire from the face of the elongate member over the protuberance into the engagement portion will suffice to provide an access portion to a protuberance.

The use of protuberances with appropriately configured access and engagement portions reduces the effort required to move a wire over a protuberance and into the engagement portion. Once engaged, the configuration of the engagement portion helps to retain the wire, thus strengthening the attachment and reducing the likelihood of accidental removal.

In an exemplary embodiment, a fencing unit may be created by injection moulding the fencing element into an insulator element, so that the insulator element is permanently fixed onto the fencing element. This means the insulator elements can be positioned at particular points along the fencing element—which can save the end user a substantial amount of time and labour as they will not need to position the insulator elements themselves. It also ensures that the insulator elements are held securely to the batten.

In an exemplary use of an embodiment of the invention, two recesses on the back of the body of a fencing insulator are pushed onto the ends of two limbs of a ‘Y’ post batten. This secures the fencing insulator relative to the batten.

Multiple fencing insulators may be secured to a single batten in this manner.

Fencing insulators are secured to multiple battens or fence posts.

Each fencing insulator includes a wire support, which includes three protuberances. The central protuberance may include a lip and/or a groove. Fencing insulators that have a lip and groove are secured to fence posts. Fencing insulators that have a lip only are secured to fence battens.

The fence posts are then inserted into the ground.

Wire is then extended between the fence posts. The wire is engaged by the wire supports that are on the fencing insulators.

The wire is forced onto the opening of the first hook shaped outer protuberance, onto the lip and/or groove of the central protuberance and onto the opening of the second hook shaped outer protuberance. Leather gloves can be used for this function, particularly for the fencing insulators with a lip as they hold the wire more securely and may be slightly less easily removed.

The central protuberance includes a ridge that extends from the lip towards the top of the fencing insulator body. The wire is held against the ridge, which causes the wire to be slightly bent. This holds the wire loosely against the wire support.

Fencing battens are then attached to the wire. Battens with secured fencing insulators are held up to the wire and the wire engaged by the wire supports on the fencing insulators.

The wire is forced onto the opening of the first hook shaped outer protuberance, onto the lip and/or groove of the central protuberance and onto the opening of the second hook shaped outer protuberance.

The central protuberance also includes a ridge. As the ridge does not have a groove the wire is bent to a larger degree than the fencing insulators that include a groove on the central protuberance. The wire is therefore held tightly against the wire support.

The wire can then be strained through the fencing insulators that are connected to the fence posts, as these hold the wire loosely.

To remove the wire the user will grasp the wire on either side of the insulator and pull upwards on one side. The force of this will pull the wire from the closest outer hook protuberance and then from the central protuberance and further outer hook protuberance.

DISCLOSURE OF A FURTHER EXEMPLARY EMBODIMENT OF THE INVENTION

According to one aspect of the present invention there is provided a fencing element which includes at least one support for a wire, wherein the fencing element includes an elongate body, characterised in that the at least one wire support includes at least one groove and at least one protruding member, wherein a line is defined along the length of the at least one groove, and at least a portion of the protruding member intersects the line.

In exemplary embodiments of the invention, the fencing element may support one or more wire(s) of a fence without being attached to a separate batten or fence post. In this embodiment, the fencing element effectively acts as a batten or fence post in its own right. However, this is not meant to be limiting and the fencing element may be configured to be attached to a batten, fence post or other structure used in fencing. The fencing element may be inserted into the ground to effectively act as a fence post—for example by hammering it into the ground using a mallet. The fencing element may be suitably configured to allow this; for example, the end to be inserted into the ground may be pointed to allow easy insertion.

Alternatively, the fencing element may be held off the ground by the fence wires to effectively act as a batten and therefore be self-supporting.

In an exemplary embodiment, the fencing element may be extrusion moulded substantially as a unitary structure. In some embodiments, the body of the fencing element may be extrusion moulded, with the protruding members of the wire support being separate structures needing to be mounted to the body.

The elongate body of the fencing element may be of any length.

In this embodiment the fencing element may be solid with minimal or no flexibility. However, in some instances it may have some flexibility depending on the material from which it is formed. For example the fencing element may be made of a plastic material such as fiberglass, polypropylene, high density polyethylene or a composite of plastic materials. However this is not intended to be limiting and the fencing element may be made of any other suitable material, such as wood or metal.

It will be understood that the body of the fencing element has at least a front face separating first and second lateral sides.

The front face of the fencing element includes at least one wire support. Each wire support includes one or more grooves and one or more protruding members. The fencing element may include any number of wire supports along its length, and therefore may hold any number of fence wires.

In this embodiment the wire support includes one or more groove(s) on the front face of the body of the fencing element that, in use, provides a seat for the wire. The grooves may be moulded in the fencing element. Alternatively, they may be cut out of the element using any cutting tool.

A single groove may extend between the first and second lateral sides of the body of the fencing element. Alternatively, the wire support may have two or more grooves proximate each side of the front face of the body. However, this is not intended to be limiting and the wire support may have any number of grooves, in any placement along the body of the fencing element.

Where multiple fencing elements are intended to be used together, the grooves may be located at substantially the same position on each element, to ensure that when the elements are in use the wire supports them at a constant level from the ground so they are kept substantially perpendicular from the ground. This may also assist to keep the wire at a constant level without unnecessary movement.

Preferably, the groove is orientated such that it is substantially perpendicular to the elongate dimension of the body of the fencing element. However, this is not meant to be limiting and in some embodiments, the groove may be orientated such it is diagonal across the front face of the body of the fencing element.

The grooves may in an exemplary embodiment be of a diameter that is only slightly larger than the diameter of the fence wire that is to be used. For example, for a 3 mm diameter wire, a 3.5 mm groove diameter may be used while for a 2 mm diameter wire, the grooves may be 2.5 mm. However this is not intended to be limiting and the grooves may be of any size.

The groove(s) define an imaginary line along their length.

In this embodiment the wire support also includes a protruding member. For example, this member may be a bolt, pin, screw or nail, although this is not intended to be limiting. In use the protruding member helps retain the wire in the grooves on the front face of the body.

A hole may be moulded or drilled in the fencing element to accommodate the protruding member, which in such embodiments is a separate component from the body. However, the protruding member may alternatively be moulded as an integral part of the fencing element.

In an exemplary embodiment the protruding member may be positioned proximate the bottom of the fencing element body relative to the groove(s). However this is not intended to be limiting and the grooves can be positioned proximate the top of the screw, or multiple grooves may be positioned proximate the top and the bottom of the protruding member.

Preferably the exemplary embodiment of the protruding member has a head.

In an exemplary embodiment the protruding member may be a screw or bolt which includes a head and a shaft. The side of the head of the screw that is closest to the body of the fencing element in use may be flat. In use the fence wire may be held between the flat side of the screw head and the body of the fencing element. This may assist in retaining the fence wire in the groove(s). The head of the screw may also be only just large enough to hold the wire in place and prevent accidental removal. Persons skilled in the art will appreciate that the screw selected for use with the present invention will be dimensioned accordingly, such that the head of the screw has sufficient surface area to contact the wire.

Reference will now be made throughout the specification to the protruding member being a screw, although as noted above this is not intended to be limiting.

The screw may be made of any material.

In an exemplary embodiment the shaft of the screw may be threaded, and a hole in the fencing element may be threaded in a complementary manner. Alternatively, or in addition, the hole in the fencing element may include an insert that is complementary to the screw and assists in securing it by providing additional torqueing force. In use of this embodiment, the screw may be threaded into the hole to a point where a fence wire can fit under the screw head. The wire is pushed under the screw head and into the groove(s). The screw may then be further threaded into the hole (for example, using a tool such as a screwdriver) to secure the wire in the groove(s). This may minimise or remove the possibility of the wire being accidentally removed from out of the groove(s). To free the wire the screw may be fully or partially threaded out of the hole.

In an exemplary embodiment the threads of the screw are approximately 2 mm apart. This is desirable as it enables the screw to securely thread into the hole in the fencing element and can be threaded in and out of the hole quickly. However, this screw thread configuration is not meant to be limiting and the threads may be closer or further apart depending on the user's requirements and availability of suitable screws.

The shaft of the screw may, in an exemplary embodiment, only include threading proximate the end of the shaft (distal the head). This may enable the fence wire to slide freely when it is being strained, and prevent damage to the fence wire. In an exemplary embodiment the threading may begin 6 mm along the shaft from the head of the screw.

The screw holes may be positioned on the bottom side of the groove(s) upon which the wire is seated.

The screw intersects the line that is defined by the length of the groove(s). This should be taken to mean that a portion of the protruding member either partially or fully crosses the line, thereby occluding it. This arrangement helps to prevent the wire from ejecting out of the grooves.

In an exemplary embodiment at least a portion of the screw head fully crosses the line.

In an exemplary embodiment, the depth of the groove compared to the size of the wire may be such that when the screw head is fully threaded into the hole in the fencing element it securely holds the fencing element to the wire. It also causes the wire to become offset which prevents the fencing element or the insulator from sliding along the wire.

In an exemplary embodiment, a single screw may be located substantially centrally between a first and second groove. The length of the first and second groove define an imaginary line which a portion of the screw head fully intersects. In use the wire will be retained in the grooves and behind the flat side of the screw head.

In another exemplary embodiment the protruding member may be a split bolt. The split bolt will be understood to include a shaft with two arms defining a recess therebetween at one end of the shaft.

The wire to be retained may be positioned within the recess and secured using a nut threaded onto the shaft. The nut can be threaded tightly against the wire to hold it securely, or alternatively it may be only slightly threaded along the split bolt so that the wire can run through the arms. The opposing end of the shaft is threaded into the aperture provided in the body of the insulator, which in this embodiment is provided in the groove.

In an alternative exemplary embodiment of the invention, the at least one groove and protruding member wire support, as described above, may be used with as a single fencing insulator to be attached to a batten or fence post, akin to the insulator described elsewhere in this specification, and may be configured accordingly. For example, the body of the fencing element may include apertures or cut-outs that are used with fasteners to secure it to a fence post or batten.

Alternatively, the fencing insulator includes a grip so that it can be secured to the fencing element.

In use of the exemplary embodiment of this invention, the screw may move through the hole in the insulator element (whether by threading or otherwise) and come into contact with the fencing element. This may push the fencing insulator away slightly from the fencing element, which in turn may force the grips to tighten their hold on the fencing element, which may prevent the fencing insulator from moving relative to the fencing element.

The end of the screw that in use will abut the fencing element may be pointed. This may help prevent the insulator from moving relative to the fencing insulator.

In an exemplary embodiment a nut may be threaded onto the end of the screw to further strengthen the fencing insulator. The nut may be moulded into the fencing insulator.

A washer may be used with the screw to help retain the fence wire. The washer can be bent on one side so that it can go over the wire to prevent the fence wire from moving out of place when the screw or bolt is threaded in.

The end of the screw may slightly compress or penetrate the fencing element, for a more secure grip. For example, the fencing element may have a hole for the screw to be threaded into. Therefore, in the use of this embodiment, the threading of the screw into the fencing insulator may both help secure the wire in the groove(s), and secure the fencing insulator to the fencing element. However, this should not be taken as limiting and other embodiments are envisaged.

The head of the screw may be configured so that only a particular tool can remove it. This may discourage theft of the fencing insulator.

In an exemplary embodiment the fencing element may have an aperture that extends along its length. The aperture may be located centrally between the first and second lateral sides of the fencing element, although this is not intended to be limiting. The aperture may be just wide enough for the screw(s) to be placed inside it—with the screw head located at the front of the fencing insulator and the screw end at the back. In this embodiment a nut may be threaded onto the end of the screw to secure the screw within the aperture. The fencing element will have grooves along its length to retain the fence wire. The screw may be slid into position and secured below a groove or grooves. In use the wire may be retained in the groove(s) and on top of the screw.

Any one of the wire support configurations described in this specification may hold the wire such that the fencing insulator does not need to be attached to a fence post or batten, as the fence wire may support the fencing insulator.

Any one of the wire support configurations may hold the wire such that the fencing insulator can be attached to a fence post or batten by using any additional fastening means or grip. In this embodiment, the insulator may be attached to a post using for example, staples, screws, nails or a bolt and nut. The bolt may be a split bolt.

The split bolt embodiment is preferably used with a fencing element in the form of a fiberglass or steel rod, however this is not intended to be limiting.

The split bolt will be understood to include a shaft. In this embodiment the bolt may be split from a point along its shaft such that it divides into two arms at one end of the shaft, defining a recess therebetween. The bolt is secured to the fencing element by positioning it such that the rod is located within the recess defined by the two arms. A nut may also be threaded onto the bolt to help secure the bolt against the fencing element. The other end of the shaft is threaded into the body of the insulator.

It can be seen that exemplary embodiments of the present invention may provide a number of advantages over the prior art:

- a fencing insulator that does not require an additional fastening means to secure the insulator to the post—it may therefore be more time and labour efficient to secure the insulator to the post;
- a fencing insulator and element that is easy and quiet to erect. The fencing insulator is user-friendly and able to be erected without requiring a professional fencing contractor—they are safe with little risk of injury;
- a fencing insulator and element this is light weight and durable, with a long product life;
- a fencing insulator and element that is cost efficient;
- a fencing insulator that is difficult to remove from the fencing element, this may prevent animals from disengaging the wires accidentally and prevent theft of the fencing insulator;
- a fencing insulator that can be secured to a batten without holes or damage to the fence post—which can be necessary if the insulator must be attached by an additional fastening means;
- a fencing insulator or element configured to hold the wire securely and prevent movement along the wire and up and down—this is particularly useful when the fencing insulator is used with a batten;

a fencing insulator that is removable from the batten;

a fencing insulator or element that releasably holds the wire. This allows the posts or battens to be removed from the wire easily and efficiently, which could be particularly beneficial for semi-portable fencing systems. Additionally, it means that the wires can be easily released by hand to let stock or vehicles through, which can save time and the monetary investment in a gate;

a fencing insulator or element that may support a wire without the need for other tools or fixing means. The wire simply needs to be engaged with the wire support, which is relatively easy and can be accomplished by hand;

a fencing insulator that can be pre-placed so that the insulator elements are evenly spaced on multiple battens. This means the wire will be substantially parallel when the posts are erected, which may save considerable time and labour when erecting a fence;

a fencing insulator that can be placed by farmers on the batten, either by hand or by the use of a tool. The fencing insulator can be placed on the battens by the farmer when and where it is convenient—the battens can then be transported to the field with the insulators attached, and subsequently erected. Furthermore, this allows the farmer to place as many fencing insulators as they wish on the batten, and choose where they place the fencing insulators to suit their needs;

a fencing insulator that can be secured to existing fence posts and battens to strengthen the fence. This may have particular application to dairy farming;

once the fencing insulator is secured to the batten no tools will be required to erect the batten, except a mallet to bang it into the ground. It will therefore be of low noise and easy to install;

the fencing insulator or element may be recyclable and therefore environmentally friendly;

the plastics fencing insulator can be used with electrical wire, and the plastics fencing element can also be used with electrical wire with minimal loss of conductivity;

the plastics fencing element can also be used with electrical wire;

the fencing insulator or element may be of any colour and shape and look distinctive;

at the very least, a fencing insulator a fencing element and fence system that provides the public with a useful choice.

BRIEF DESCRIPTION OF THE DRAWINGS

Further aspects of the present invention will become apparent from the ensuing description which is given by way of example only and with reference to the accompanying drawings in which.

BEST MODES FOR CARRYING OUT THE INVENTION

Figure 1:
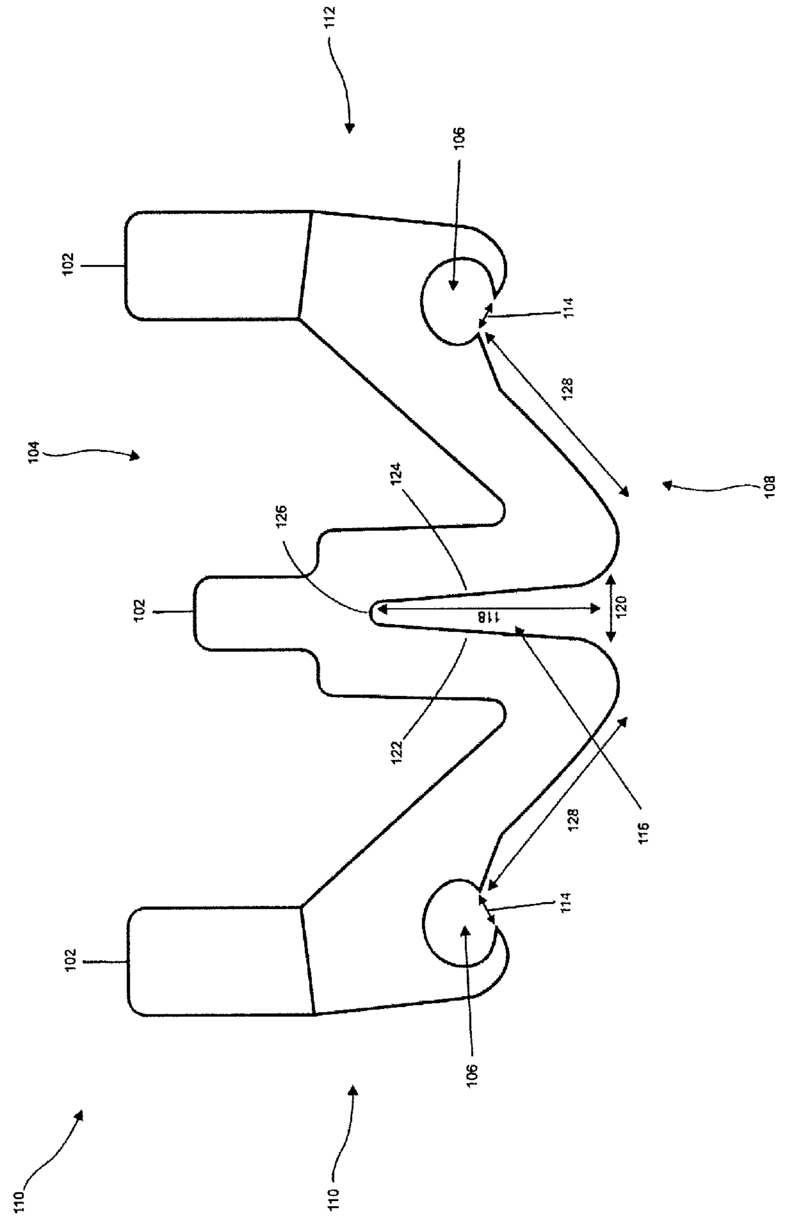
FIG. 1 is a top view of an exemplary insulator element.

A fencing insulator according to an exemplary embodiment of the present invention is generally indicated by (100) in FIG. 1.

The fencing insulator (100) is a unitary structure. It includes a wire support of three protuberances (102) aligned substantially across the front (indicated generally by the arrow 104) of the insulator body. These protuberances are configured to engage with a wire (not shown) of a fence (not shown).

Two grips (106) are positioned on the back (indicated generally by the arrow 108), proximate the first and second lateral sides (indicated generally by the arrows 110 and 112 respectively) of the fencing insulator (100).

Each grip (106) is a recess that is configured to be substantially complementary to the end of a limb of a 'Y' post batten (not shown). The opening (114) is the narrowest part of the recess (106), which allows the recess (106) to retain the end of a limb of a batten to secure the fencing insulator (100) to the batten. In use, each recess will envelop the entirety an end of a 'Y' post batten limb (not shown).

The fencing insulator (100) includes a depression (116) that extends between the top and bottom (not shown) of the fencing insulator. The depression is substantially in the center of the first and second lateral sides (110 and 112).

The depression has a first open mouth (118) at the top of the fencing insulator (100) and a second open mouth (not shown) at the bottom of the fencing insulator.

The depression also has an elongate opening (120) on the back (110) of the fencing insulator (100).

The first lateral side (122) and second lateral side (124) define the width of the depression (116). These are sloped, with the widest point being the elongate opening (120) and the narrowest point being the end (126). This makes it easier for the first and second lateral sides of the depression (122 and 124) to be moved away from each other when the first and second lateral sides of the body (110 and 112) are pushed closer together.

The depth of the depression is defined by the elongate opening (120) and the end of the depression (126).

The depression has a depth of over one third of the depth of the fencing insulator (100). This allows the first and second lateral sides of the body (110 and 112) to be pushed closer together, which assists the gripping function of the insulator.

The back of the body (108) includes two sloped portions (128). These are angled such that the back of the body is complementary to the configuration of a 'Y' post batten (not shown).

Figure 2:
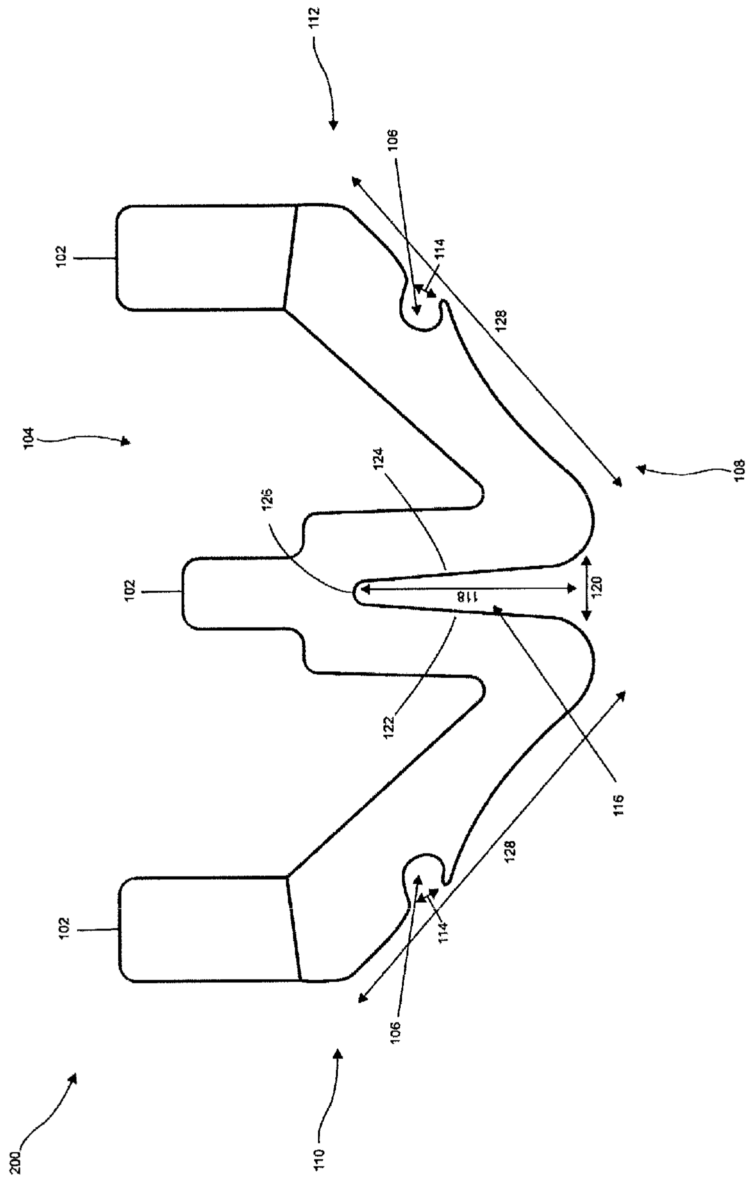
FIG. 2 is a bottom perspective view of an exemplary insulator element.

FIG. 2 shows a bottom perspective view of a second exemplary embodiment of the fencing insulator, indicated generally by the arrow 200. In this embodiment the grips (106) are positioned along the sloped portions (128). They are configured to be complementary to the inside of the end of a 'Y' batten limb (not shown) so that in use the recess will only receive inside part as opposed to enveloping the full end of the batten limb.

Figure 3:
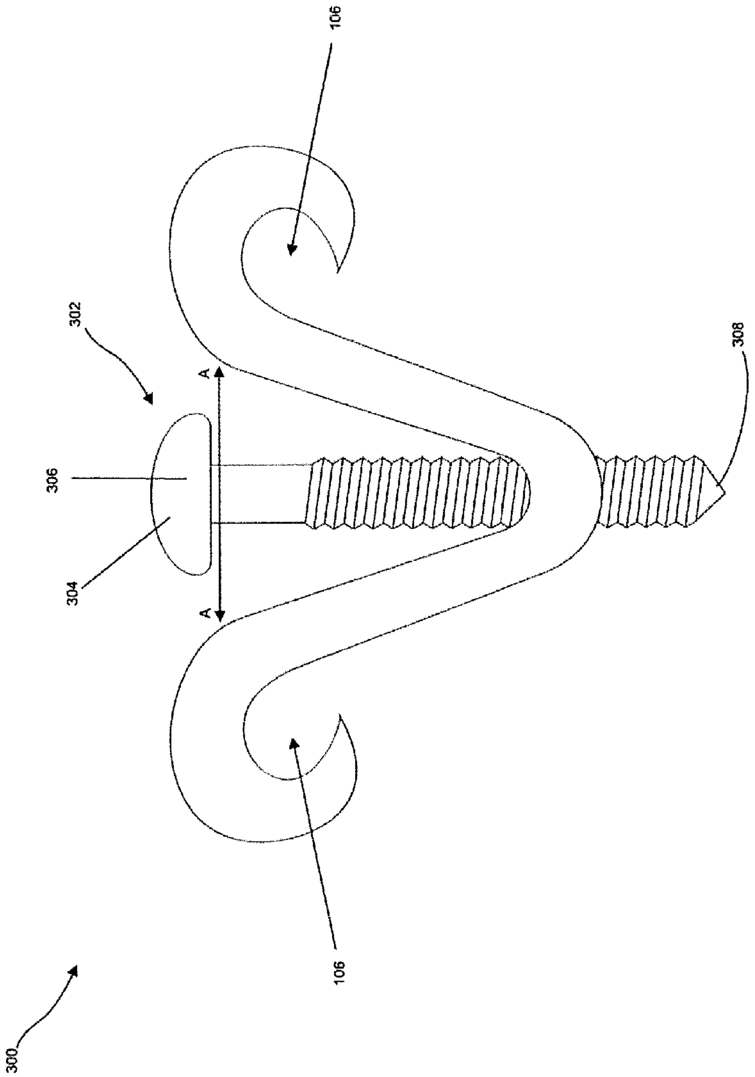
FIG. 3 is a top view of an exemplary insulator element.

FIG. 3 shows a top view of a third exemplary embodiment of the invention (indicated generally by the arrow 300). In this embodiment the fencing insulator includes grips (106) to secure the insulator to a batten (not shown). It includes a wire support of two grooves (not shown) on either side of the front of the insulator body and a substantially central protruding member (indicated generally by arrow 302). The protruding member (302) acts to retain the wire in the grooves (not shown), which define a line or axis (line A-A) which runs substantially perpendicular to the elongate dimension of the insulator (300).

In this embodiment, the protruding member is a screw (302).

The screw has a head (304). The head (304) has a flat side (306) that in use is closest to the body of the fencing insulator (300).

The screw also has an end (308) that in use will be proximate the batten or fence post (not shown). The end may abut the fence to secure the insulator (300) to the batten. In this embodiment, the end (308) is pointed which may allow the end to slightly compress into or penetrate the batten which may secure the insulator (300) more tightly to the batten.

Figure 4:
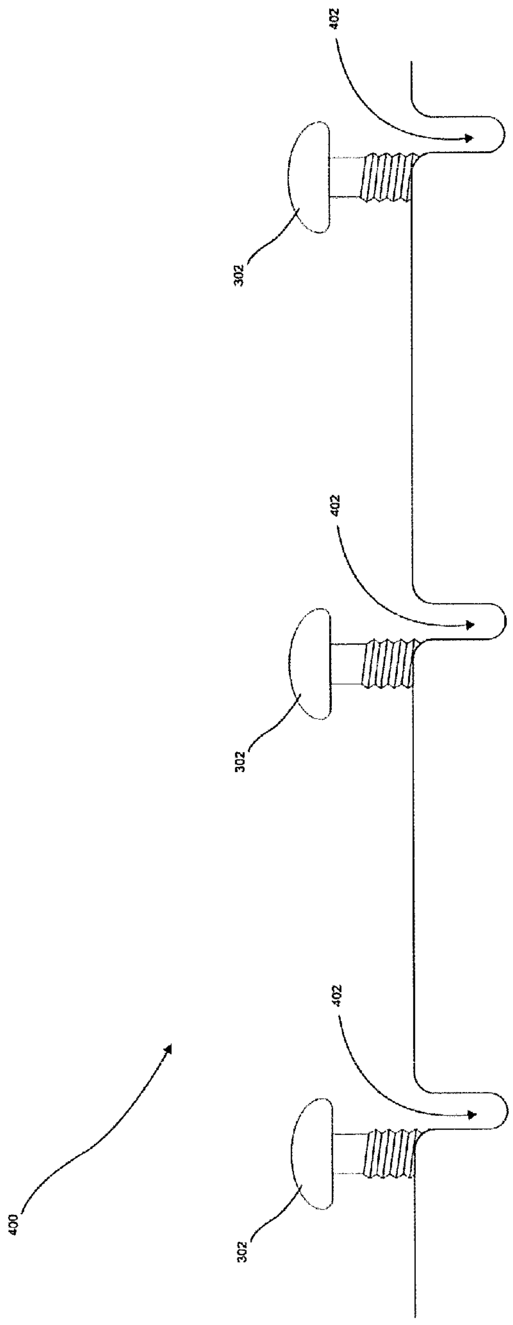
FIG. 4 is side view of the length of an exemplary insulator element.

FIG. 4 shows a view of the length of the fencing element according to an exemplary embodiment of the invention (indicated generally by the arrow 400). The fencing element of this embodiment has an elongated length for use as either a batten or a fence post. The fencing element includes multiple wire supports that each include a screw (302) and a groove (indicated generally by 402) to secure multiple fence wires (not shown).

Figure 5:
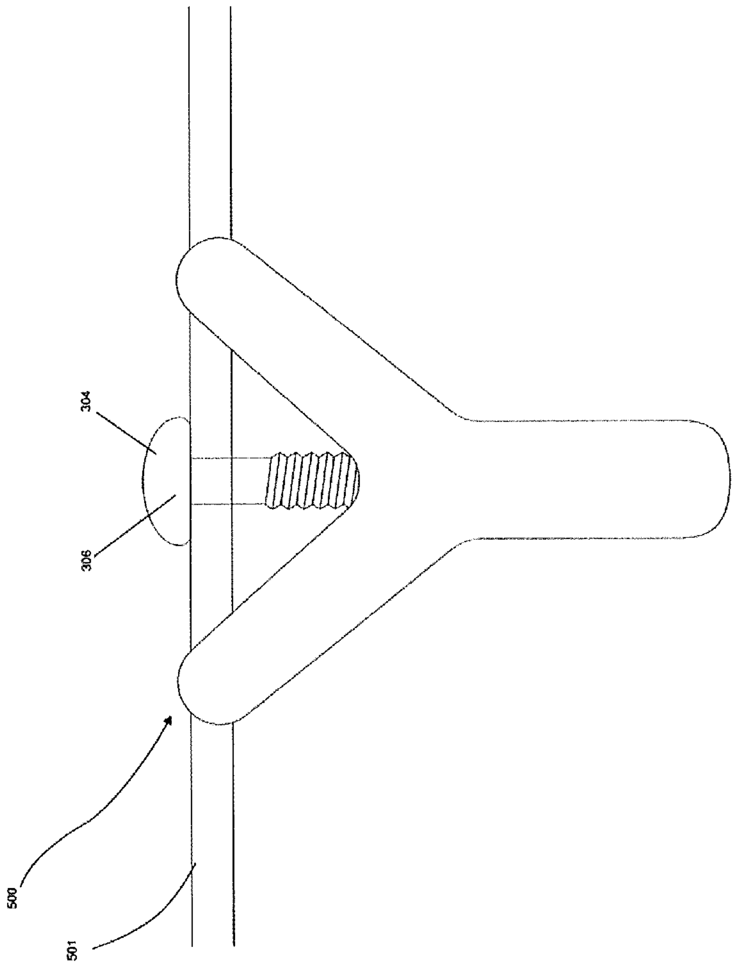
FIG. 5 is a top view of an exemplary insulator element.

FIG. 5 is a top view of a further exemplary embodiment of the fencing element (indicated generally by arrow 500). In this embodiment the fencing insulator is a Y batten with an elongate length. The wire (501) is retained in the grooves (not shown) with the flat side (306) of the head (304) preventing it from falling out.

Figure 6:
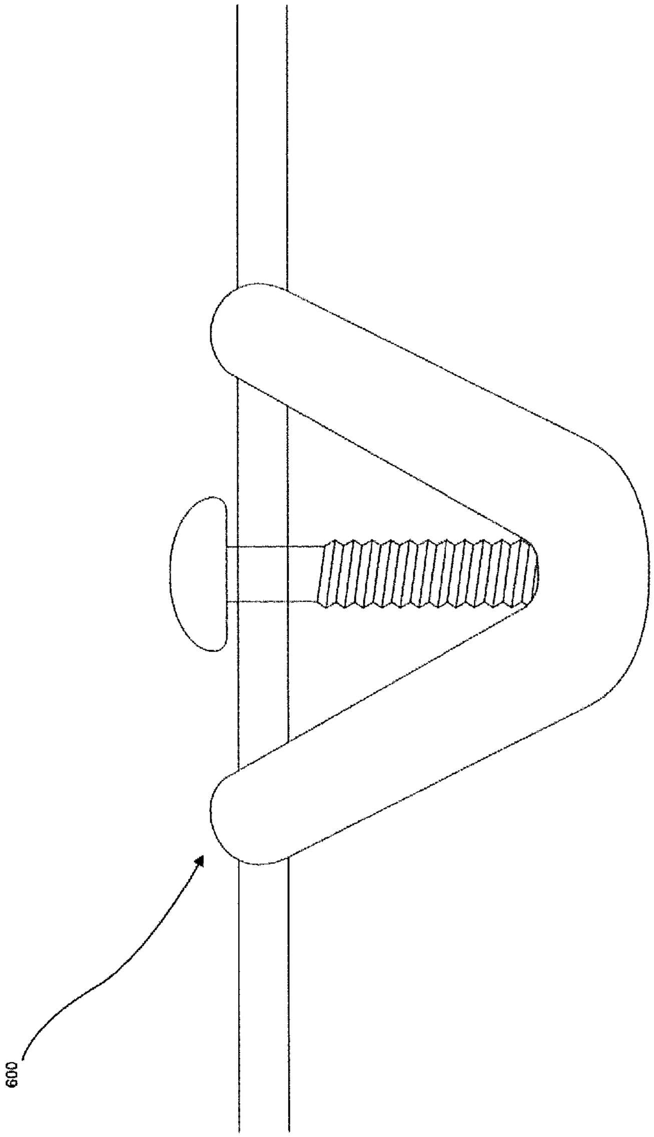
FIG. 6 is a top view of an exemplary insulator element.

FIG. 6 is a view of the top of an exemplary embodiment of the fencing element (indicated generally by arrow 600). In this embodiment the fencing element is two sides of a Y batten with an elongate length. As the fencing element is only two sides of the Y batten this may be save on materials for producing the fencing insulator and therefore reduce costs.

Figure 7:
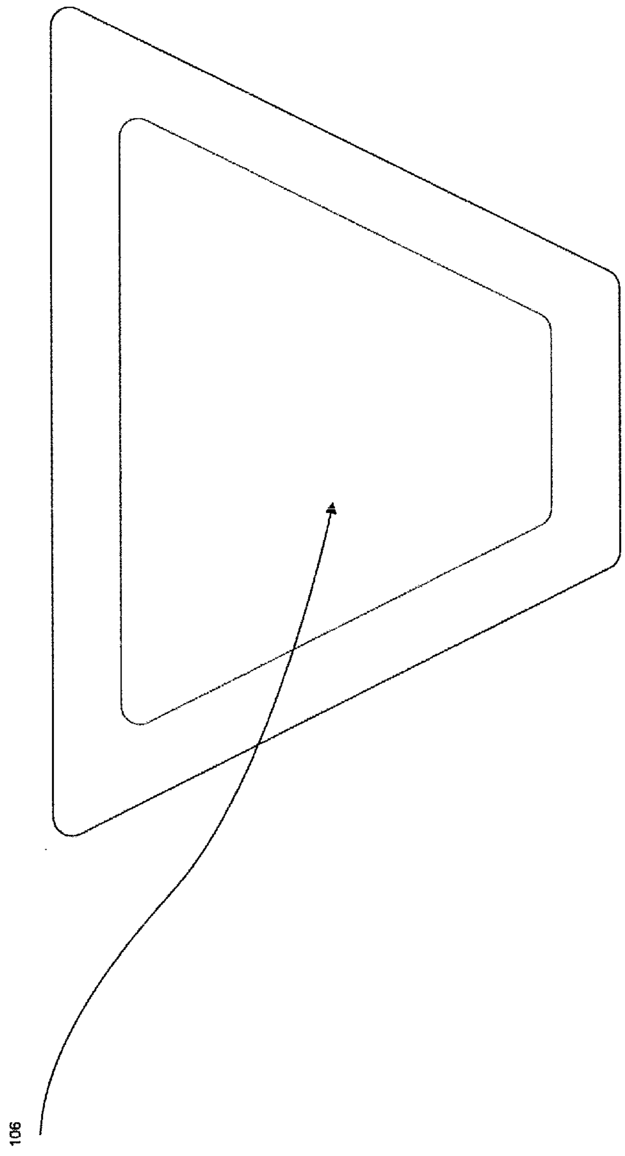
FIG. 7 is a top view of an exemplary insulator element.
Figure 8:
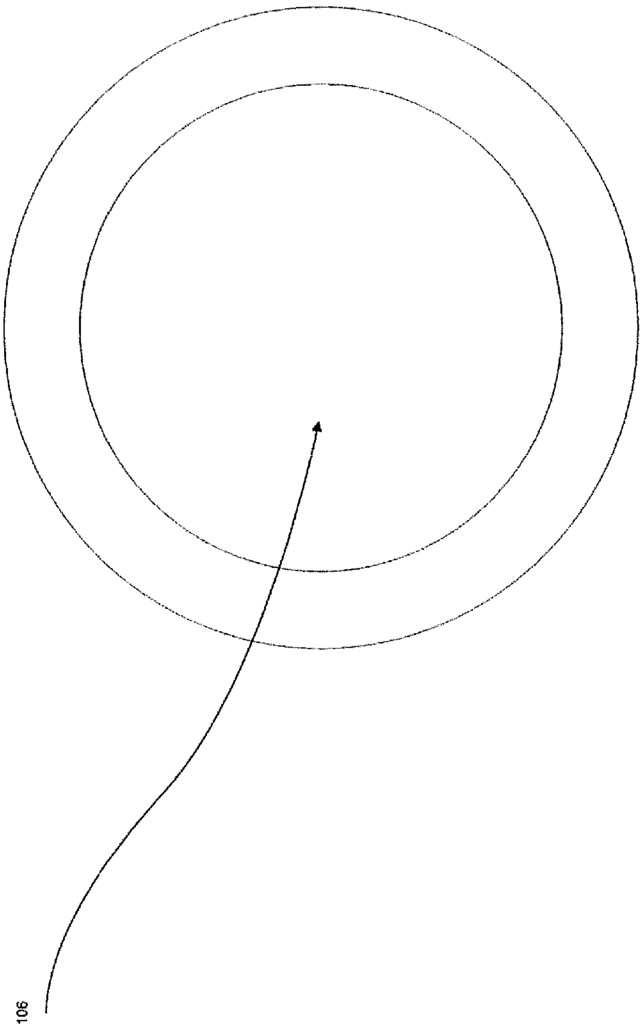
FIG. 8 is a top view of an exemplary insulator element.

FIGS. 7 and 8 show further exemplary embodiments of the fencing element which include a single grip (indicated generally by arrow 106) that is fully enclosed.

Figure 9:
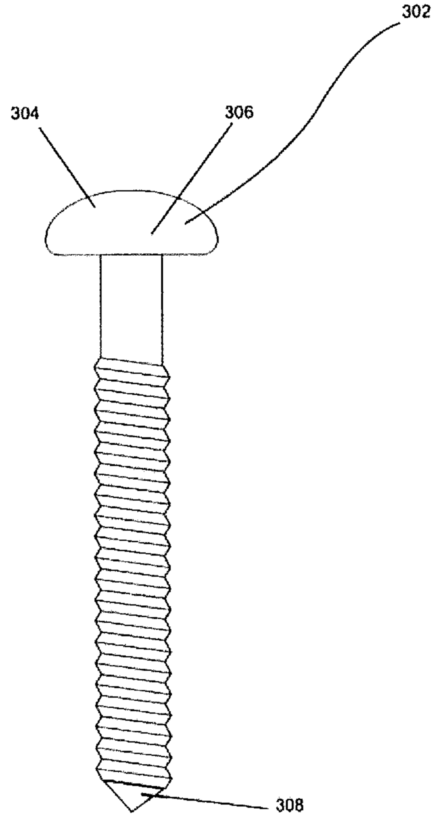
FIG. 9 is a side view of the threaded screw.

FIG. 9 is a side view of the threaded screw which is used as the protruding member in exemplary embodiments of this invention.

Figure 10:
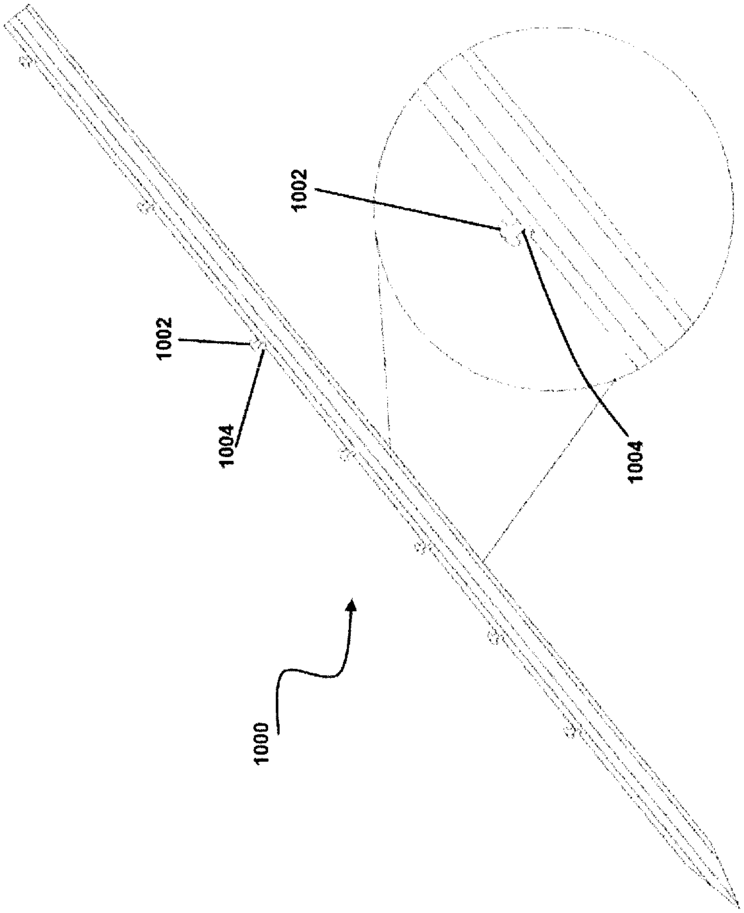
FIG. 10 is a side view of an exemplary fencing element.

FIG. 10 shows a side view of an exemplary embodiment of the fencing element (indicated generally by arrow 1000). In this embodiment the fencing element includes multiple wire supports that each include a screw (1002) and a groove (1004) which is positioned proximate the bottom of the screw.

Figure 11:
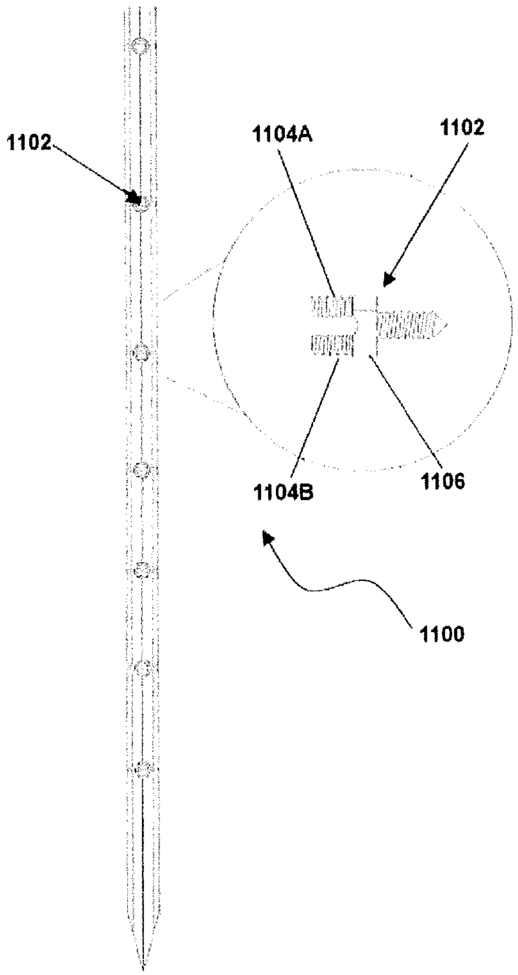
FIG. 11 is a front view of an exemplary fencing element.

FIG. 11 shows a front view of a further exemplary embodiment of the fencing element (indicated generally by arrow 1100). In this embodiment the fencing element includes multiple wire supports that each include a split bolt (1102). Each split bolt includes two arms (1104A and 1104B) that split from the length of the bolt. The split bolt also includes a nut that helps secure the bolt (1106) against the fencing element.

Figure 12:
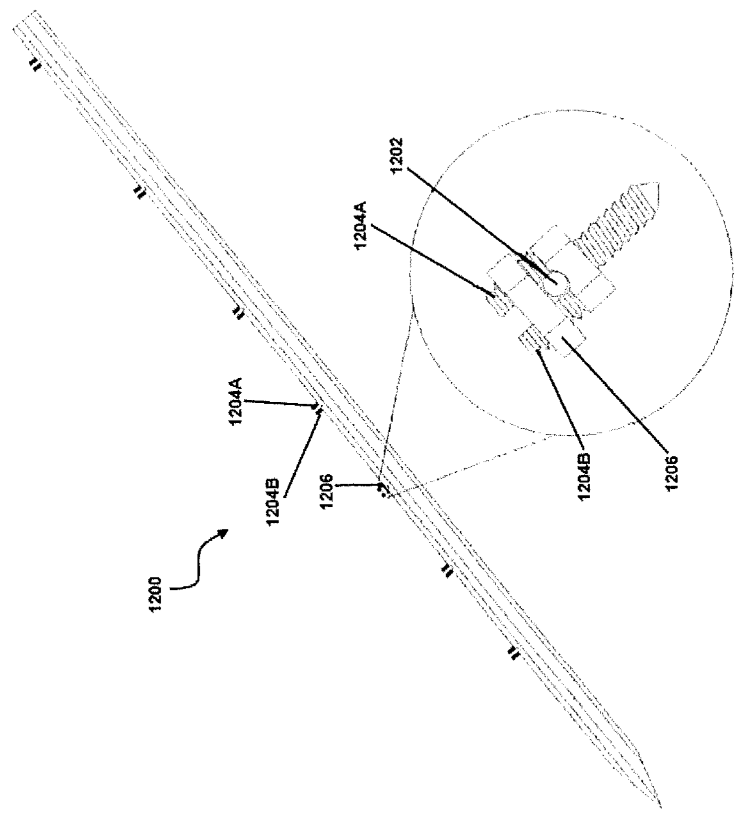
FIG. 12 is a side view of an exemplary fencing element.

FIG. 12 shows a side view of a further exemplary embodiment of the fencing element that includes the split bolt wire support system (indicated generally by arrow 1200). The wire (1202) is threaded between the two arms (1204A and 1204B) and a nut (1206) threaded onto the top of the bolt (1208) to secure the wire (1202) within the arms (1204A and 1204B).

Figure 13:
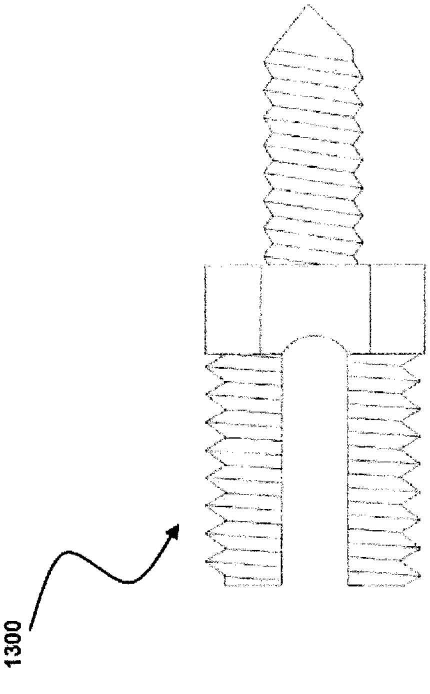
FIG. 13 is a side view of an exemplary split bolt.

FIG. 13 shows a side view of an exemplary embodiment of the split bolt (1300). It can more clearly be seen that the shaft (1302) is split into two arms (1304 and 1306) defining a recess (1308) there between. The split bolt can be articulated with a tool (not shown) using the head (1310), positioned midway down the shaft.

Figure 14:
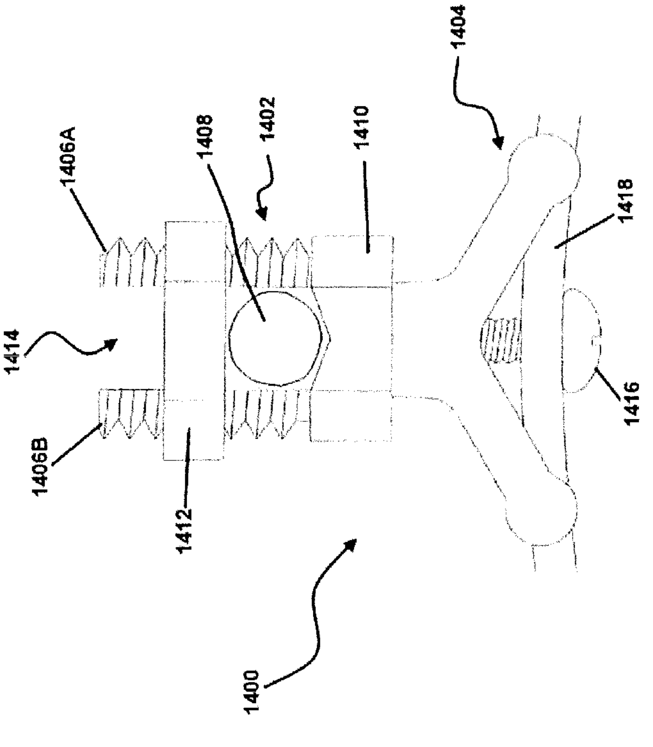
FIG. 14 is a top view of an exemplary fencing element when used as a fencing insulator together with the split bolt of FIG. 13.

FIG. 14 shows a top view of a fencing element when used as a fencing insulator (1400), together with the split bolt (1300) of FIG. 13. The fencing insulator, moulded as a one-piece component, of this embodiment includes a wire support (indicated generally by arrows 1402, 1404, and 1408). Extending from the front face (1406) of the insulator (1400) is a screw (1408) which with grooves (not visible) on either side (1402 and 1404) of the insulator constrain a fencing wire (1410).

The split bolt (1300) secures the insulator (1400) to a post (1412) which is inserted into the recess (1308) that is defined by the two arms (1304 and 1306). The post is then secured between the head (1310) and a nut (1414) threaded onto the arms (1304, 1306) of the split bolt (1300).

Aspects of the present invention have been described by way of example only and it should be appreciated that modifications and additions may be made thereto without departing from the scope thereof of the appended claims.

I claim:

1. A fencing element which includes at least one wire support for a wire, wherein the fencing element includes a body having an elongate dimension and a front face, a first lateral side, and a second lateral side, wherein the at least one wire support includes at least one groove on the front face and orientated substantially perpendicular to the elongate dimension of the body, and at least one protruding member, characterized in that wherein a line is defined along the length of the at least one groove, and at least a portion of the at least one protruding member intersects the line, wherein the body includes an opening into which the at least one protruding member is inserted, and wherein the at least one protruding member is a threaded fastener.

2. A fencing element according to claim 1, wherein the fencing element is a batten.

3. A fencing element according to claim 1, wherein the fencing element is a fence post.

4. A fencing element according to claim 1, wherein the fencing element is an insulator for a batten or a fence post.

5. A fencing element according to claim 4, wherein the body includes apertures for fasteners to secure the fencing element to a fence post or batten.

6. A fencing element according to claim 5, wherein the fastener is a split bolt, wherein the split bolt includes a shaft with two arms defining a recess therebetween, wherein the fence post or batten is positioned in the recess.

7. A fencing element according to claim 1, wherein the fencing element includes multiple wire supports.

8. A fencing element according to claim 1, wherein the at least one groove extends between the first lateral side of the body and the second lateral side of the body.

9. A fencing element according to claim 1, wherein the threaded fastener includes a head.

10. A fencing element according to claim 9, wherein the portion of the threaded fastener that intersects the line is the head.

11. A fencing element according to claim 1, wherein the at least one wire support includes a single threaded fastener that is located substantially centrally between a first groove and a second groove orientated substantially perpendicular to the elongate dimension of the body.

12. A fencing element according to claim 1, wherein at least one wire support includes a single groove that is positioned proximate the top of the body relative to a single threaded fastener.

13. A fencing element according to claim 1, wherein the threaded fastener is a threaded screw.

14. A fencing element according to claim 1, wherein the threaded fastener is a bolt.

15. A fencing element according to claim 14, wherein the threaded fastener is a bolt, wherein the bolt has a shaft with two arms defining a recess therebetween.

16. A fencing element according to claim 1, wherein the opening includes an insert for the threaded fastener.

17. A method for supporting a fence wire, the method comprising:

providing a fencing element according to claim 1, and supporting a fence wire with said fencing element.

18. A method of manufacturing a fencing unit, the method comprising:

providing a fencing insulator, providing a fencing element according to claim 1, and fixing the fencing element to the fencing insulator by injection moulding.

* * * * *